US007128109B2

(12) United States Patent
Tardif

(10) Patent No.: US 7,128,109 B2
(45) Date of Patent: Oct. 31, 2006

(54) ESSENTIAL OIL RECLAIM APPARATUS, AND METHOD OF USE

(76) Inventor: Daniel Tardif, 1067, Route 393, Palmarolle, (Québec) (CA) J0Z 3C0

( * ) Notice: Subject to any disclaimer, the term of this patent is extended or adjusted under 35 U.S.C. 154(b) by 150 days.

(21) Appl. No.: 11/033,394

(22) Filed: Jan. 12, 2005

(65) Prior Publication Data

US 2005/0155852 A1 Jul. 21, 2005

Related U.S. Application Data

(60) Provisional application No. 60/536,727, filed on Jan. 16, 2004.

(51) Int. Cl.
*A01G 23/095* (2006.01)
*B27L 1/00* (2006.01)

(52) U.S. Cl. ........................ 144/343; 144/3.1; 144/4.1; 144/24.13; 144/208.7

(58) Field of Classification Search ................ 144/335, 144/343, 3.1, 4.1, 208.7, 24.13; 241/101.76, 241/193; 100/126, 127, 110
See application file for complete search history.

(56) References Cited

U.S. PATENT DOCUMENTS

| | | | | |
|---|---|---|---|---|
| 4,098,311 A | | 7/1978 | Larsson | |
| 4,214,616 A | * | 7/1980 | Brisson | 144/24.13 |
| 4,537,362 A | | 8/1985 | Zuloaga | |
| 4,690,187 A | * | 9/1987 | Schmidt | 144/340 |
| 4,711,280 A | * | 12/1987 | Schmidt | 144/208.7 |
| 4,717,081 A | | 1/1988 | Hamilton | |
| 4,889,169 A | * | 12/1989 | Peterson et al. | 144/208.7 |
| 4,947,906 A | * | 8/1990 | Schroeder | 144/208.7 |
| 4,989,655 A | * | 2/1991 | Peterson et al. | 144/341 |
| 5,148,844 A | | 9/1992 | Robison | |
| 5,226,757 A | | 7/1993 | Tarrant | |
| 5,400,908 A | | 3/1995 | Prestwood | |
| 6,086,002 A | | 7/2000 | Frazier et al. | |

* cited by examiner

*Primary Examiner*—Bena Miller
(74) *Attorney, Agent, or Firm*—François Martineau

(57) ABSTRACT

An essential oil reclaim method for use with a corresponding apparatus, comprising the following steps: the apparatus grabs the tree parts, the tree tops or the tree limbs, and shakes them with rotating drums provided with chains (under whiplash effect); the needles are segregated through a vibrating sieve; the needles are compressed for a first essential oil extraction under mechanical compression; the needles are then pushed into a sealed chamber comprising an endless screw which upwardly conveys the needles; steam is sprayed on the needles, so as to thermally extract essential oils from condensate; the needle residues, or "muka", escapes from the top end of the thermal chamber. This essential oil reclaim apparatus also relates to the invention.

19 Claims, 9 Drawing Sheets

ESSENTIAL OIL RECLAIM APPARATUS, AND METHOD OF USE

FIELD OF THE INVENTION

This application claims convention priority based upon co-pending U.S. provisional patent application No. 60/536,727 filed Jan. 16, 2004. The present invention is directed toward economical reclaim of smaller coniferous tree parts (e.g. needle resinous trees, such as firs, pine trees, tamarack, and spruce) after a delimbing machine and a log retrieving machine have felled and removed larger tree parts. This reclaim is done in a continuous feed fashion.

BACKGROUND OF THE INVENTION

In order to recover forestry products in an economically efficient fashion, it is necessary to have on site power-assisted machinery capable of recovering efficiently all wood products obtained when logging timber. Indeed, in the wood logging industry, large machines and trucks are required to fell upstanding trees, delimb these felled trees, load the logs into a trailer, ship these logs loaded trailers to a remote location with a truck, and eventually unload these logs to a processing facility. These large machines and trucks represent considerable capital cost, and operating them is also expensive in fuel, maintenance and labour costs.

It is noted that it is the logs per se which is usually identified as having the highest economical reclaim value, since the other parts of the tree (branches, needles, . . . ) may be simply discarded as wastes that do not warrant reclaim, and left on site in the forest. However, the needles—and to a lesser extent other tree parts such as bark and some small branches—do contain economically valuable so-called "essential oil" component therein. This essential oil can, when properly purified, be used in high margin products used in aromatherapy, in the manufacture of pharmaceutical products, in cosmetics, in perfumes, in soaps and in detergents.

Moreover, even the extracted residues from the essential oil purification process (fragments of branches and needles without their essential oil), also called in the industry the "muka", could generate at least some economic value, in particular for animal feed as for example vitamins and proteins. Such muka could be used in place of antibiotics as food supplements for animal feed, which is desirable in view of limiting as much as possible use of antibiotics for medical treatment in order to deter development of microbial resistance to antibiotics in the digestive tract of these animals—and of humans who may eventually eat meat from these animals.

OBJECTS OF THE INVENTION

The main object of the invention is therefore to increase the efficiency of timber reclaim operations in the wood logging industry.

A second object of the invention is to develop a method of economical reclaim of essential oil from needles in coniferous type trees.

A third corollary object of the invention is to reduce the amount of wastes generated by the wood logging industry and left over on the site in the forest where the trees are felled.

SUMMARY OF THE INVENTION

The invention therefore relates to an essential oil reclaim apparatus for continuous extraction of essential oil from coniferous tree needles, said apparatus comprising:—conveyor means, for moving in a continuous fashion a number of felled coniferous tree parts from a felled tree intake loading area, through a processing area, and toward a tree discharge outlet;—an impacting unit, mounted into said processing area for shaking the trees for releasing branches and needles thereof from the felled coniferous tree;—first screen means, mounted beneath said impacting unit for segregating separate branches from needles falling down from said impacting unit;—a compression unit, defining a main elongated tubular body having: a) a needle intake, mounted beneath said first screen means for collecting the needles segregated by said first screen means; b) a liquid outlet, mounted spacedly from said needle intake; c) compression means acting inside said tubular body and extending between said needle intake and said essential oil outlet for continuously compressing the needles wherein a liquid phase of needles is mechanically extracted from the solid needle parts to flow as a liquid inside the tubular body and to escape said tubular body through said liquid outlet of the tubular body; wherein reclaim of liquid essential oil from the tree needles may be obtained from said liquid phase of needles.

There may be added to the apparatus a coarse muka outlet, mounted on said tubular body downstream of the first mentioned said essential oil outlet, for through passage of the solid needle parts, and further including a vapour unit for fine thermal extraction of essential oil from the solid needle parts, said vapour unit comprising: an endless screw assembly having an intake end, in fluid communication with said coarse muka outlet for loading therein coarse muka generated by said compression means, and a fine muka outlet end, opposite said intake end thereof; fluid spraying means, mounted to a first intermediate section of said endless screw assembly intermediate said intake end and said outlet end of the endless screw assembly, for spraying water vapour onto the coarse muka moving along said endless screw assembly; condensate collecting means, mounted to a second intermediate section of said endless screw assembly being intermediate said spraying means and said fine muka outlet end, for collecting condensate water vapour and essential oil vapour generated from the sprayed coarse muka moving along said endless screw assembly; fine muka collecting means, mounted downstream of said fine muka outlet end of endless screw assembly; wherein fine thermal extraction of essential oil from coarse muka is obtained at said condensate collecting means.

Said impacting unit may include a main frame carrying a number of power driven rotating drums spaced from one another, each said drum comprising a number of flexible chains peripherally spaced from one another, said chains extending radially under centrifugal forces when said drums are rotating, the relative location of said drum and the length of said chains being such as to generate a felled tree passageway therebetween whereby said chains are able to reach out to most of the branches of the felled trees moving through said processing area.

Said first screen means could consist of: a) a perforated plate, independently mounted to said main frame of said impacting unit, and b) a vibratory motor means for reciprocating in vibrating mode said perforated plate; wherein only small tree part elements beyond a set threshold shall be allowed to pass freely through said first screen means and toward and into said needles intake.

Said perforated plate could be inclined, and further including branch collecting means mounted beneath the lowermost edge of said inclined perforated plate, whereby branches falling onto said perforated plate slide slopewisely therealong toward and into said branch collecting means away from said perforated plate to clear the way for through passage of the needles through said perforated plate.

A second perforated plate could be mounted beneath the first mentioned perforated plate, each of the first mentioned perforated plate and of said second perforated plate having a plurality of bores adapted to register with one another in an operative condition thereof, and ram means for carrying and reciprocating said second perforated plate relative to the first mentioned perforated plate whereby a shearing action is formed between the first mentioned perforated plate and said second perforated plate. Each of said perforated plates define throughbores having a maximum diameter ranging between about 6 to 30 mm, with optimal value being about 15 mm.

Said compression means could include a pair of first and second hydraulic ram members, extension and retraction of said first and second hydraulic ram members occurring in alternating fashion for continuous feed of solid needle parts through said coarse muka outlet of the tubular body.

Said spraying means could include a steam generator, a feed line fluidingly interconnecting said steam generator and said first intermediate section of endless screw assembly, and at least one nozzle member mounted over said endless screw assembly and directed toward the latter at said first intermediate section thereof.

Said condensate collecting means could includes a head plate, carried spacedly over said second intermediate section of endless screw assembly, a condenser unit, a feed line fluidingly interconnecting said condenser unit and said head plate for fluid flow from said head plate of water vapour and of essential oil vapour, a vapour P-trap segregating water vapour from essential oil vapour at said condenser unit, and a collecting tank, for collecting liquid essential oil segregated from water vapour by said vapour P-trap.

Preferably, there is added a fine muka collecting means, mounted at the downstream end of said fine muka outlet end of endless screw assembly.

Preferably also, there is added an arcuate screen, applied against said liquid outlet of compression unit, said arcuate screen having a plurality of bores each of a size sufficient for free passage of essential oil rich liquid phase exclusively of solid coarse muka.

The porosity of each bore of said arcuate filter plate screen may define a maximal bore size ranging between 0.4 and 1 mm.

An alternate arcuate filter plate screen may be applied against said second intermediate section of endless screw assembly, said arcuate filter plate screen being porous to gaseous essential oil and to water vapour for through passage thereof toward said condensate collecting means, but being impervious to solid fine muka. The porosity of said arcuate filter plate screen could define a maximum bore size ranging between 0.5 and 1 mm.

The invention also relates to a process making use of the above-noted apparatus, said process comprising the following steps:—moving in a continuous fashion on a conveyor member a number of felled coniferous trees from a tree intake loading area, through a processing area, and toward a tree discharge outlet;—shaking the trees with an impacting unit mounted into said processing area for releasing branches and needles thereof from the felled coniferous tree;—screening the branches from the needles with first screen means, mounted beneath said impacting unit for segregating branches from needles of the trees;—compressing in continuous fashion the needles generated by said first screen means to mechanically extract essential oil therefrom as liquid outflow, whereby a solid phase coarse muka is obtained; wherein reclaim of liquid essential oil is obtained from needles.

Preferably, the process comprises the following additional steps:—moving through an endless screw said coarse muka from a loading end toward a fine muka outlet end;—spraying water vapour onto the coarse muka at an intermediate spraying section of said endless screw;—collecting the condensate from water vapour and essential oil vapour generated from the coarse muka at a section of said endless screw intermediate said spraying section thereof and said fine muka outlet end thereof; segregating water vapour from essential oil vapour from said condensate; and collecting the thus segregated said essential oil vapour; wherein fine thermal extraction of essential oil is further achieved.

The following additional step may be added to this process: collecting the fine muka at said fine muka outlet end of endless screw assembly, once said fine muka exits therefrom.

DETAILED DESCRIPTION OF THE PREFERRED EMBODIMENT OF THE INVENTION

Figure 1:
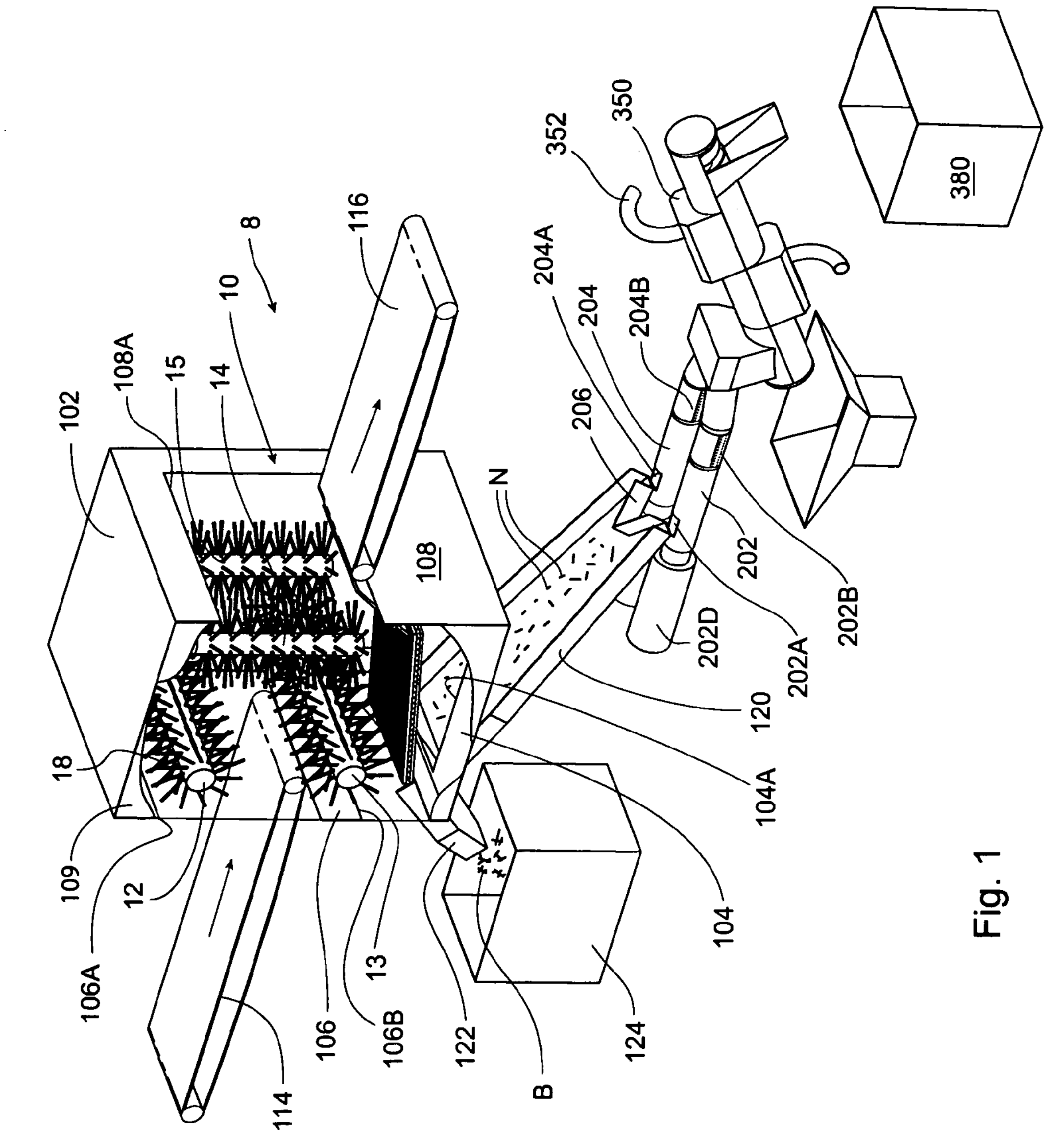
FIGS. 1 and 2 are isometric views from two different perspectives of the oil reclaiming apparatus according to a preferred embodiment.
Figure 2:
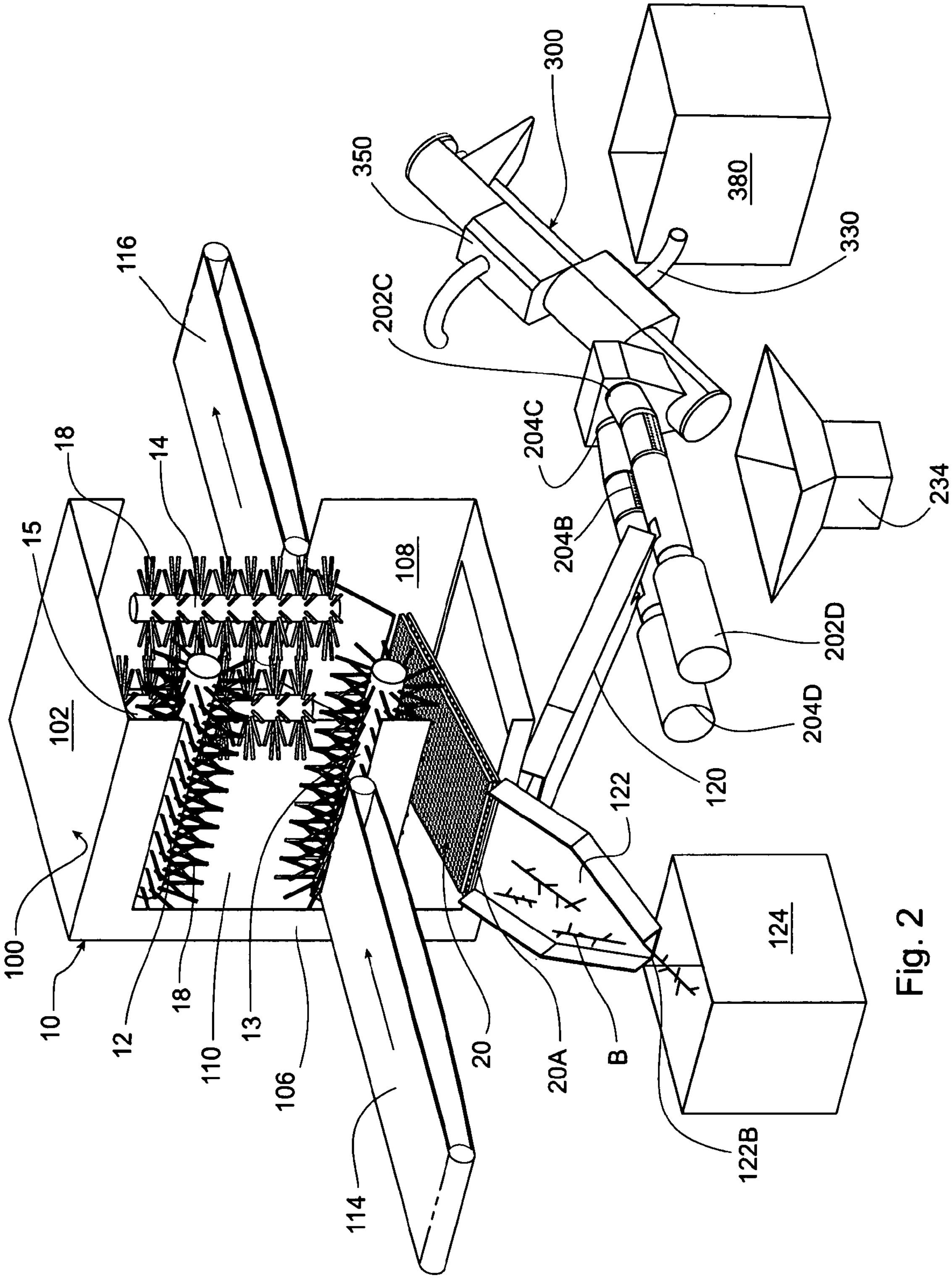
Figure 3:
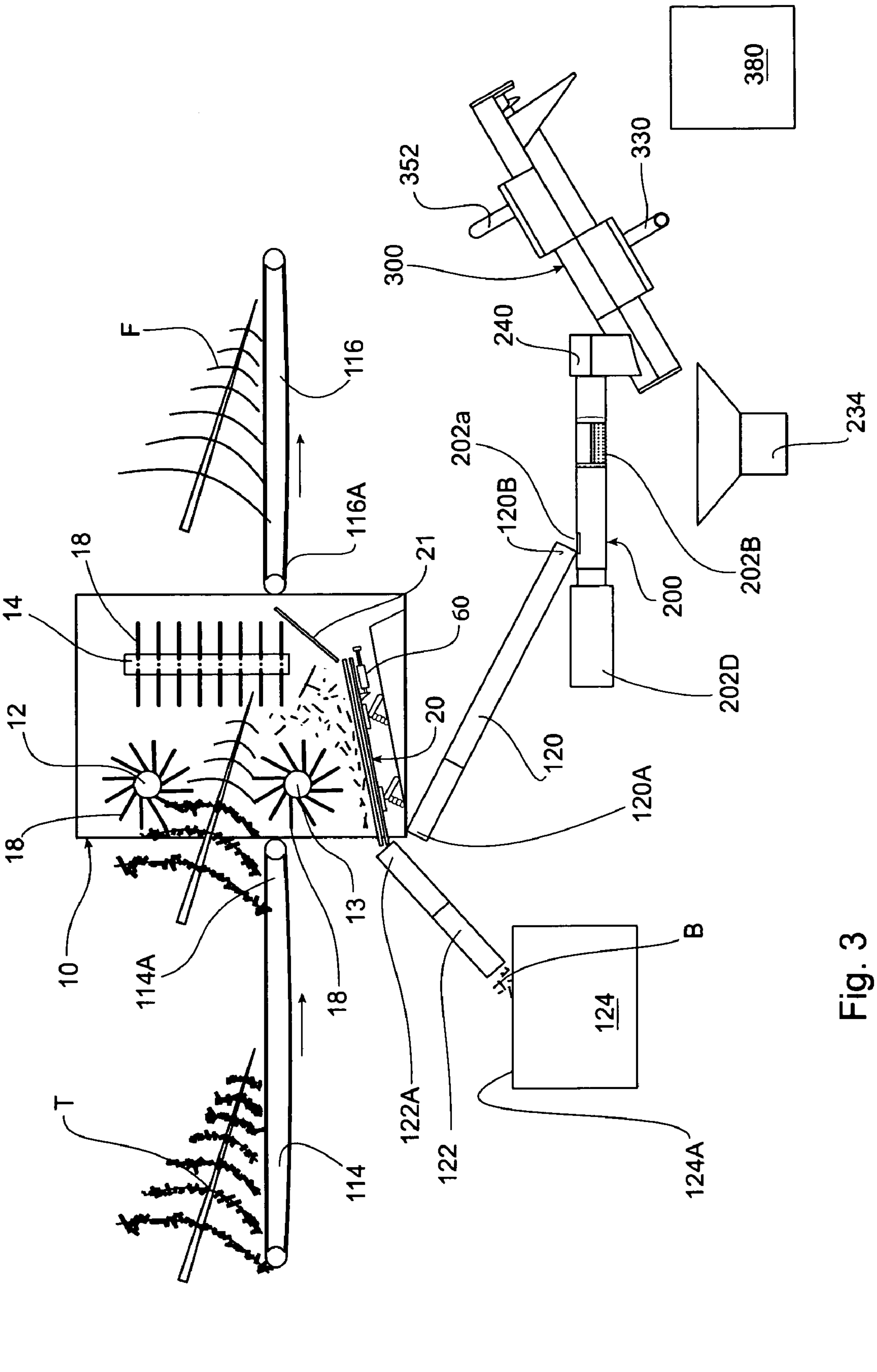
FIG. 3 is a side elevational view of this oil reclaiming apparatus, at a smaller scale than FIGS. 1–2.
Figure 3A:
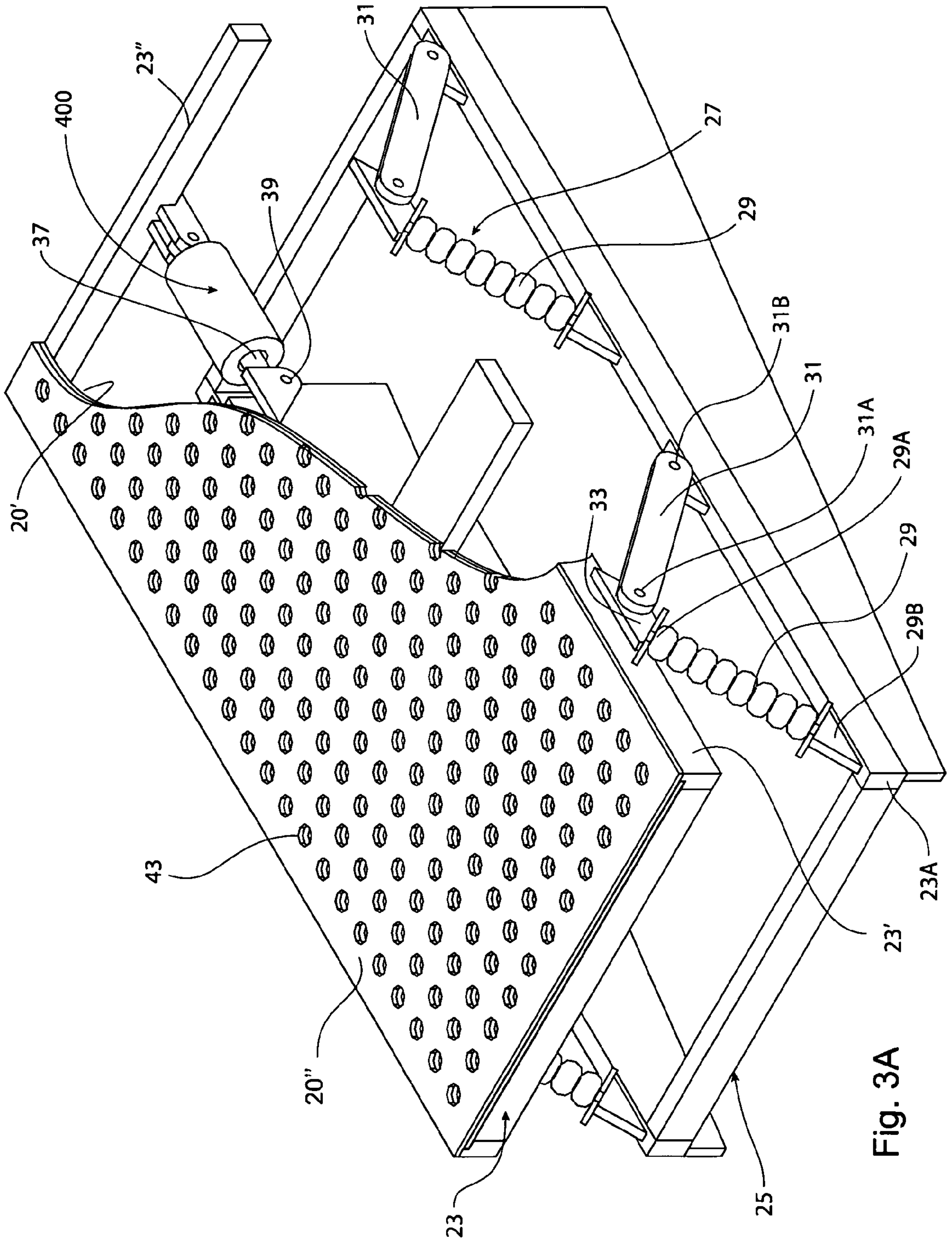
FIG. 3A is a partly broken isometric view of the vibratory screen member.
Figure 3B:
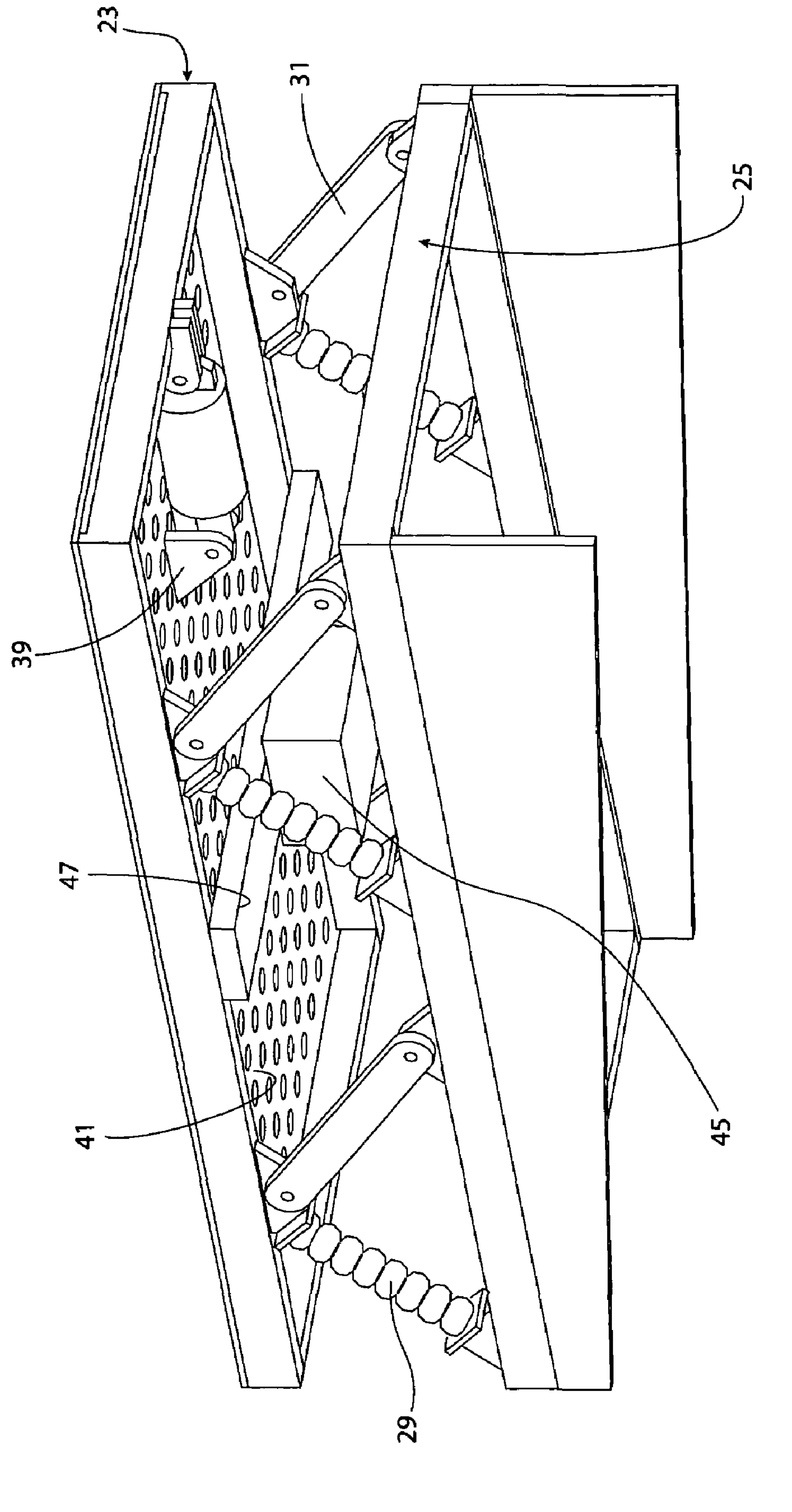
FIG. 3B is an isometric view of the vibrating screen member, from a different perspective than that of FIG. 3A.
Figure 4:
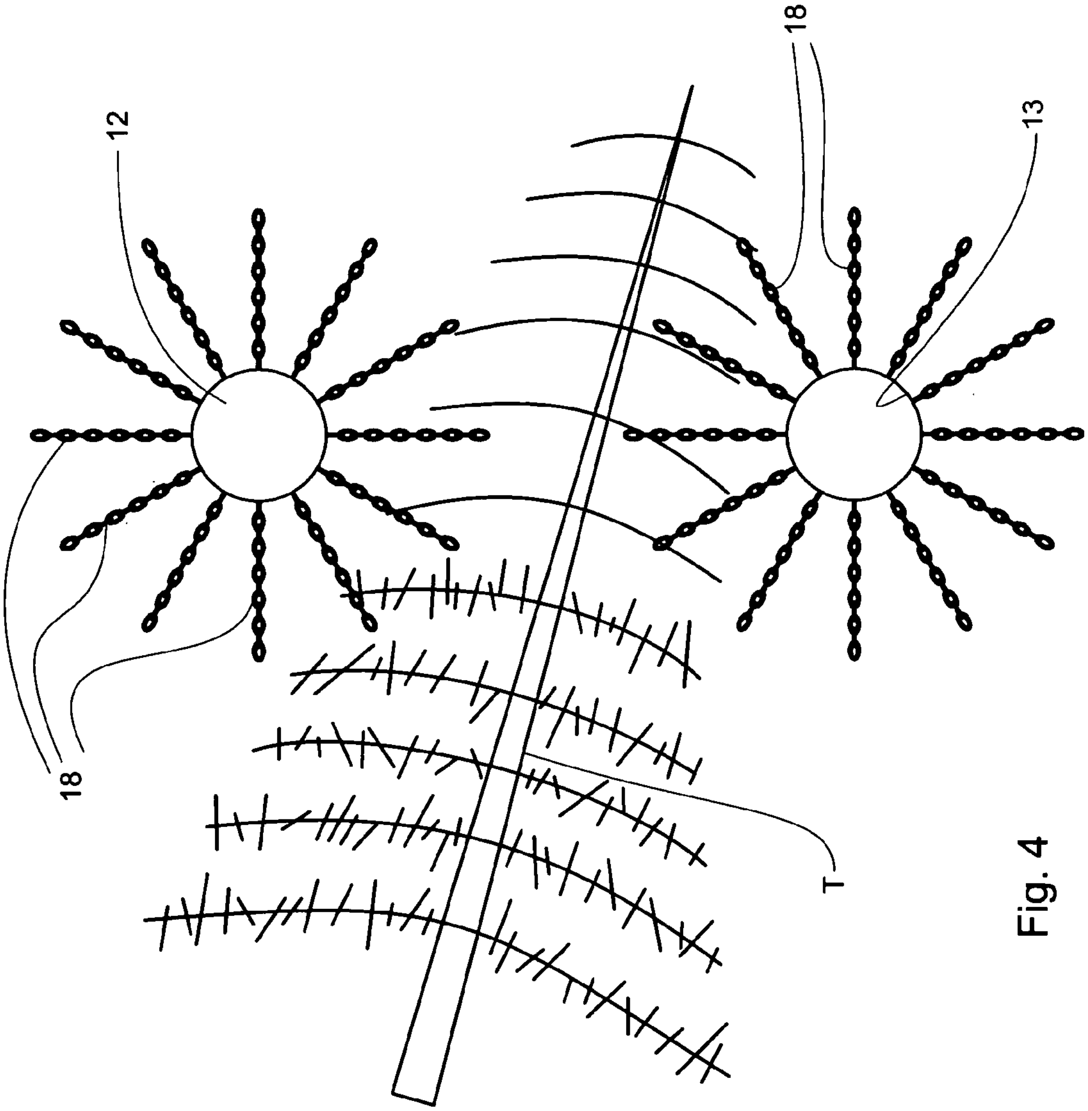
FIG. 4 is an enlarged side elevational view of chain driving rotating drum, suggesting how a pine tree is shaken by the rotating chains and progressively released from its needles.

FIGS. 1–3 of the drawings show the apparatus in operation, sequentially suggesting how a large coniferous tree is moved along a conveyor belt to be relieved from tree parts including small branches, barks and needles, and how these small tree parts are treated to economically reclaim the essential oils therein.

More particularly, the apparatus of the invention, 8, includes a central segregating unit 10 having a number (for example, two pairs as shown) of laterally spaced rotating drums 12, 13, 14 and 15. Each drum 12–15 carries a number of peripherally spaced apart flexible chains 18, which under centrifugal bias from the rotating drums, will radially extend.

Unit 10 further includes an open box 100 comprising top and bottom horizontal walls 102, 104, and lateral vertical side walls 106, 108, 109, 110. Top and bottom walls 102, 104, are endwisely engaged and rotatably carried by vertical rotating drums 14, 15, while opposite side walls 109, 110, are endwisely engaged and rotatably carried by horizontal rotating drums 12, 13. Each of opposite side walls 106, 108, include a large window 106A, 108A, in horizontal register with one another. The bottom edge of window 106A is engaged by the outlet end 114A of an upstream tree loading conveyor belt assembly 114, while the bottom edge of window 108A is engaged by the intake end portion 116A of a downstream tree discharge conveyor belt assembly 116. Drums 12 and 13 extend in closely spaced fashion to the top and bottom edge portions of side wall 106 adjacent upstream window 106A, while drums 14 and 15 extend in closely spaced fashion to the opposite lateral side edge portions of side wall 108 adjacent window 108A, so that rotating drums 12–15 clear and form therebetween a passage for trees T passing therethrough from upstream conveyor 114 to downstream conveyor 116.

Another aperture 106B is made on wall 106 beneath aperture 106A. Still another aperture 104A is made in bottom wall 104 of box 100. Apertures 104A, 106A are outlets for branches B, twigs, needles N and other debris detached from trees T and generated by the rotating chains 18, as will be detailed hereinbelow.

Various small tree parts T, for example tree stumps, tree tops, and tree limbs, are thus placed on conveyor 114, and are fed to the central unit 10 by this first feed conveyor belt 114.

As shown in FIGS. 3, 3A, 3B and 7 of the drawings, an inclined vibrating screen member 20 is positioned below overhanging drums 12–15, being operatively mounted between side walls 109, 110, and extends through and into lower aperture 106B, to gravity collect larger vegetal material dislodged by the rotating chains 18 under whiplash effect. Vibrating screen member 20 includes two superimposed inclined perforated plates 20', 20". Upper plate 20 may be quadrangular, and includes a peripheral downturned flange 23. An open rigid quadrangular support frame 25 is anchored to side walls 109–110 of box 100, and is articulated at each of the four corners thereof to corresponding corner portions of each of the pair of upper plate side flanges 23' by suspension means 27. Each suspension means 27 includes a shock absorber 29 and a link arm 31, both pivoted at converging upper ends 29A, 31A to a first pivot mount 33. Shock absorber 29 is anchored at its lower anchor end 29B opposite end 29A to a corresponding one of the corner edges 23A of side flange 23', while lower pivot mount end 31B of link arm 31 is pivotally mounted to an intermediate portion of that corresponding side flange section 23', wherein shock absorber 29 and link arm 31 form an inversely V-shape structure. As such, each assembly 29, 31, can partially sink or "spread apart" under load, as will be explained hereinbelow.

Figure 7:
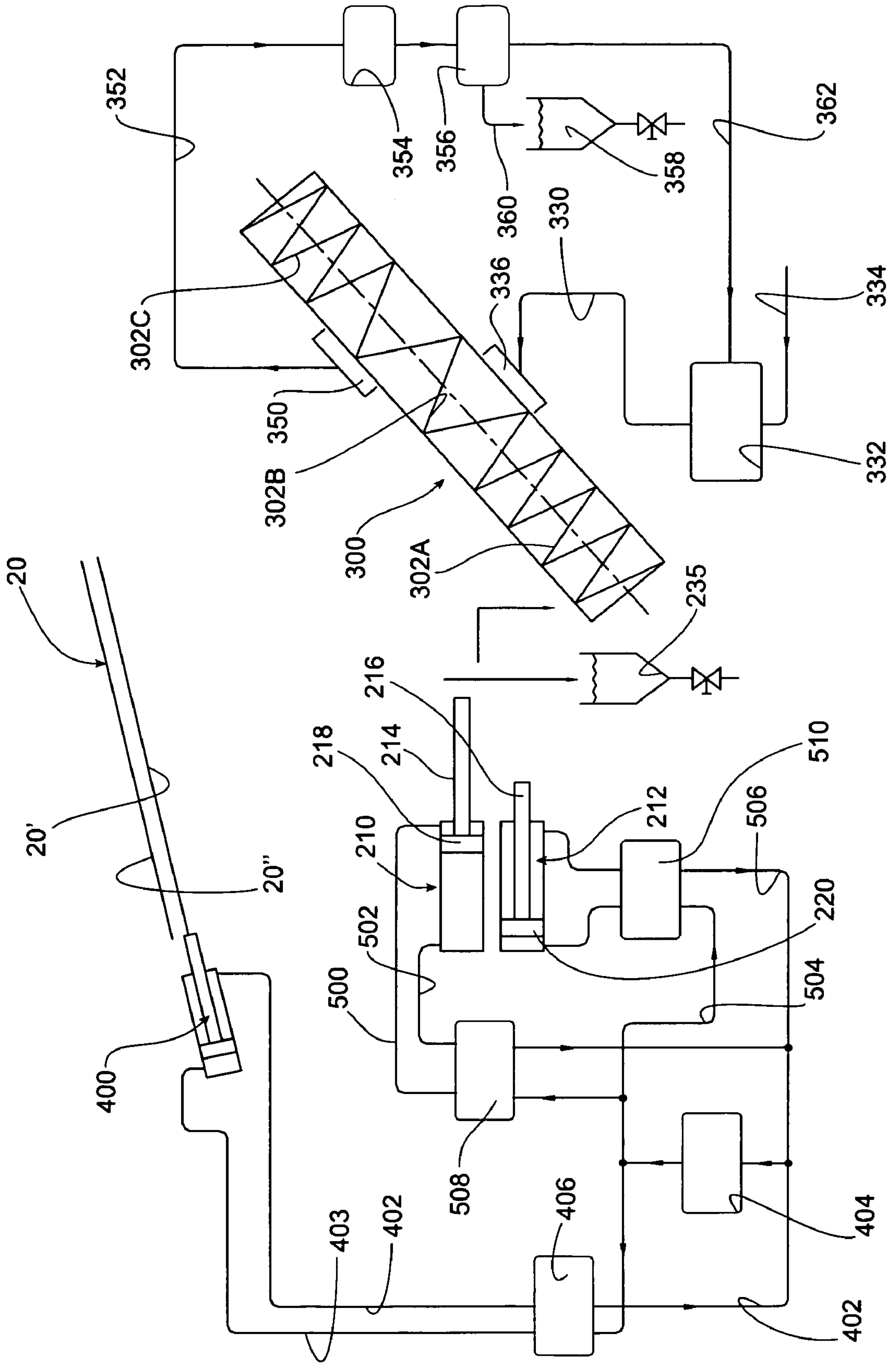
FIG. 7 is a functional block diagram of the essential oil reclaiming apparatus of the invention.

To one of the pair of end flange sections 23" is anchored a ram member 400. A piston 37 is movable from ram member 400 and is anchored at its outer end to a bracket 39 carried transversely beneath lower plate 20'. As best illustrated in FIG. 7, hydraulic fluid is fed to hydraulic ram 400 via a first pair of intake/outlet feed lines 402, 403, from a hydraulic source and pump assembly 404. Hydraulic fluid flow through hydraulic line 402 is controlled by control valve 406.

At the retracted limit position of piston 37 of ram member 400, plates 20' and 20" are maintained parallel to one another and also maintain selected bores 41 from plate 20' in direct axial register with corresponding bores 43 of plate 20". On the other hand, at the extended limit position of piston 37, these corresponding pairs of bores 41 and 43 become at least partly offset relative to one another. Therefore, lower plate 20' is movable parallel relative to upper plate 20", under power from ram member 400, but plates 20', 20" are usually kept stationary relative to one another.

Vibratory motor means 45 are provided to generate oscillating motion of plates 20', 20", relative to stationary underlying open support frame 25. Accordingly, plates 20', 20", may move toward or away from support frame 25, for example by a one centimeter play, during oscillating motion, since shock absorbers 29 may temporarily decrease in length to accommodate the load as is known in the art. Motor means 45 preferably generates continuous oscillating motion. Motor means 45 may be anchored to an anchor panel 47, itself anchored at both ends to the opposite pair of side flanges 23', 23'. Vibratory motor 45 may be of any known make, for example of conventional eccentric cam type.

An additional stationary plate 21 may be positioned beneath drums 14–15, at a much greater inclination than screen 20. Plate 21 straddles the lower edge of window 108A and the proximate inner edge of screen 20, and may be edgewisely anchored to walls 109, 110 by anchoring means. Additional plate 21 may simply be for example an upwardly inclined extension of perforated plate 20", to ensure a substantially continuous screen means surface beneath chain drums 12–15 and between conveyors 114 and 116.

Vibrating screen 20 is destined to receive tree part debris falling from rotating chain drums 12–15. Under vibrating motion from vibratory motor means 45, vibrating screen 20 promotes gentle downward sliding of larger tree part debris B slopewisely of the top surface of vibrating screen 20, while clearing the bores 41, 43, of the screen plates 20', 20", for free passage of smaller tree part debris N of a size smaller than a set maximum threshold value. However, discrete sliding strokes of lower perforated plate 20', parallel to upper plate 20", may also be generated by ram member 400 in a periodic fashion, for example, one fore and aft stroke each half hour, to shear loose larger tree particles that may come to accidentally become stuck into some registering bores of plates 20', 20", and clog same.

It is understood that under usual vibratory conditions, the bores of plates 20', and 20", remain in corresponding registering pairs, to allow free flow-through of small tree part particles through both plates 20', 20", below a set maximum size threshold; it is only when ram member 400 is activated—say for example for a single back and forth stroke each half hour—that the bores of plate 20' become offset relative to corresponding bores from the other plate 20", for dislodging by shearing action limit size tree particles that may have become stuck in these bores.

The screen mesh of each plate 20', 20", is such that the maximum size of particulate material allowed to seep through apertures on the plates plate 20', 20" and collected therebelow, may range for example between 6 mm to 30 mm, and preferably be about a maximum of about 15 mm; wherein needles N, twigs or bark fragments, are allowed through plates 20', 20" to fall therebeyond and through and beyond bottom aperture 104A, exclusively of other larger tree material, B which are retained by plates 20', 20".

A first chute 120 is mounted in inclined fashion beneath and in register with aperture 104A, to collect falling fine particles N. Chute 120 is anchored at its top end 120A to bottom wall 104 adjacent side wall 106.

A second chute 122 is mounted in inclined fashion beneath first conveyor belt assembly 114, to collect coarse particles B. Chute 122 is anchored at its top end 122A to the lower edge portion of side wall 106, beneath to and in co-extensive register with the downstream end 20A of vibrating screen member 20, whereby all coarse particles B intercepted by and sliding along the top surface of vibrating screen member 20 will fall onto and slide along chute 122.

The lower end 122B of chute 122 is mounted to the top mouth 124A of a large dump box 124. Tree material B falling into dump box 124 may be oriented towards another transformation process not related to essential oil transformation. Chutes 120, 122, are downwardly diverging relative to one another as best seen in FIG. 3.

Screen 20 not only segregates the smaller size needles N from larger size tree parts B, due to the selected size of apertures in the screen 20, but also promotes detachment of the needles N from their twigs B under the vibrating motion of the screen 20. The portion of trees F exiting from the chain treatment unit 10 through window 108A, is evacuated by a horizontal conveyor belt 116, to a disposal site. Tree parts F (FIG. 3) are no longer needed, and may therefore be simply disposed of according to the invention.

The lower end 120B of inclined chute 120 is anchored to an intermediate section of an elongated compression unit 200. Compression unit 200 consists of at least one, but preferably a pair of tubular assemblies 202, 204 (FIG. 1). Each tubular assembly 202, 204, may extend for example horizontally, and includes a fine tree particles intake port 202A, 204A, at a top surface of an intermediate portion thereof, in register with lower outlet end 120B of chute 120. Accordingly, the lower end 120B of ramp 120 may be provided with one (or more) inversely V-shape diverters 206, as illustrated in FIG. 1 or 5, to direct economically valuable fine tree particles N into the selected tubular apertures 202A, 204A, without accidental fall-out so as to prevent waste, depending on the total number of tubular assemblies.

Tubes 202, 204, also each has second apertures 202B, 204B opening downwardly and located intermediate between ramp 120 and the ends 202C, 204C of tubes 202, 204 which is opposite ramp 120. Tube ends 202C, 204C, each forms a tube outlet mouth, as detailed hereinbelow. End portions 202D, 204D of tubes 202, 204, opposite ends 202C, 204C, extend beneath ramp 120 and each lodge a hydraulic ram, as disclosed hereinbelow.

Figure 5:
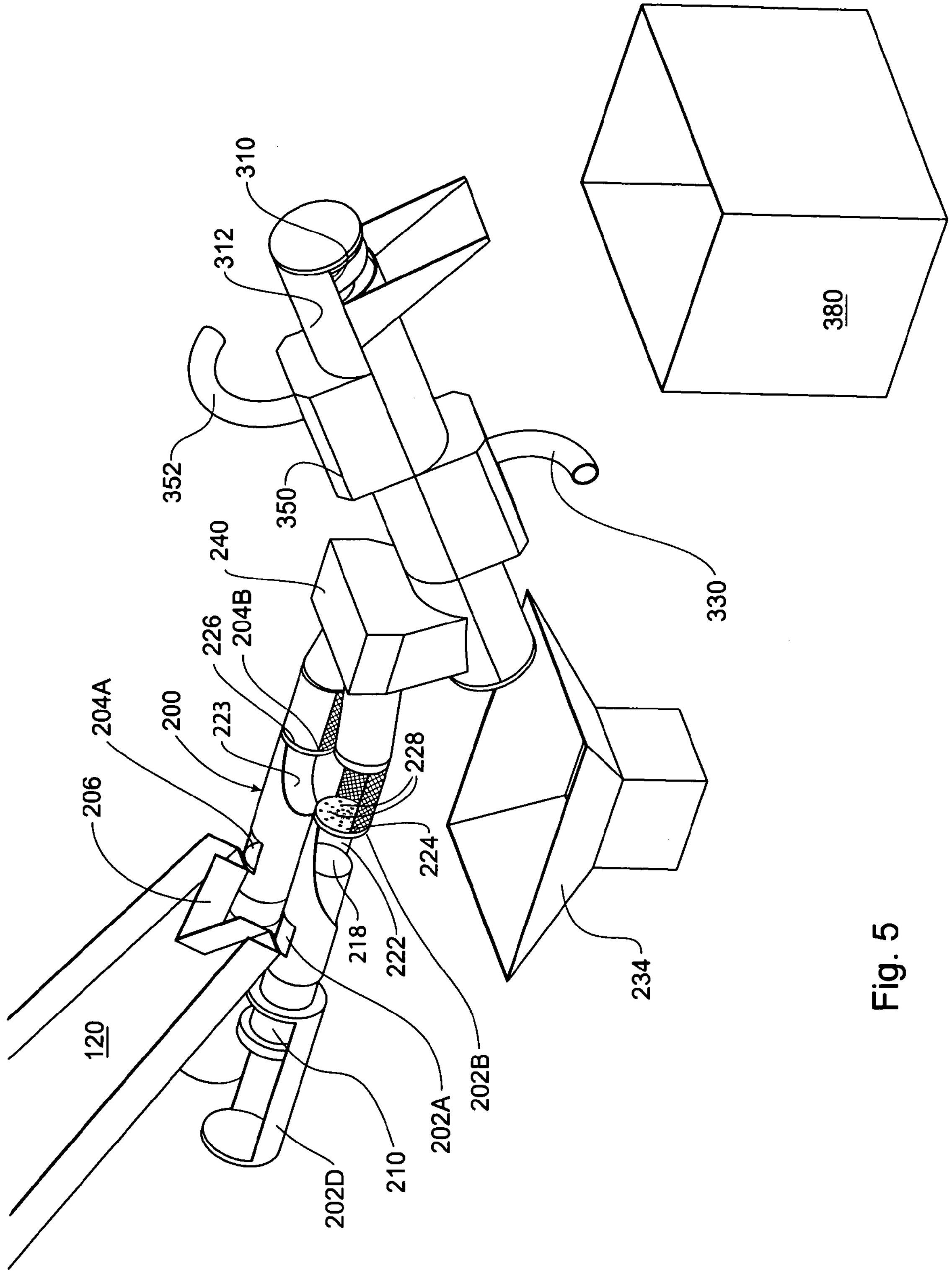
FIGS. 5 and 6 are enlarged isometric views from two different perspectives of the compression unit and steam generating unit at the downstream end portion of the present essential oil reclaim apparatus.
Figure 6:
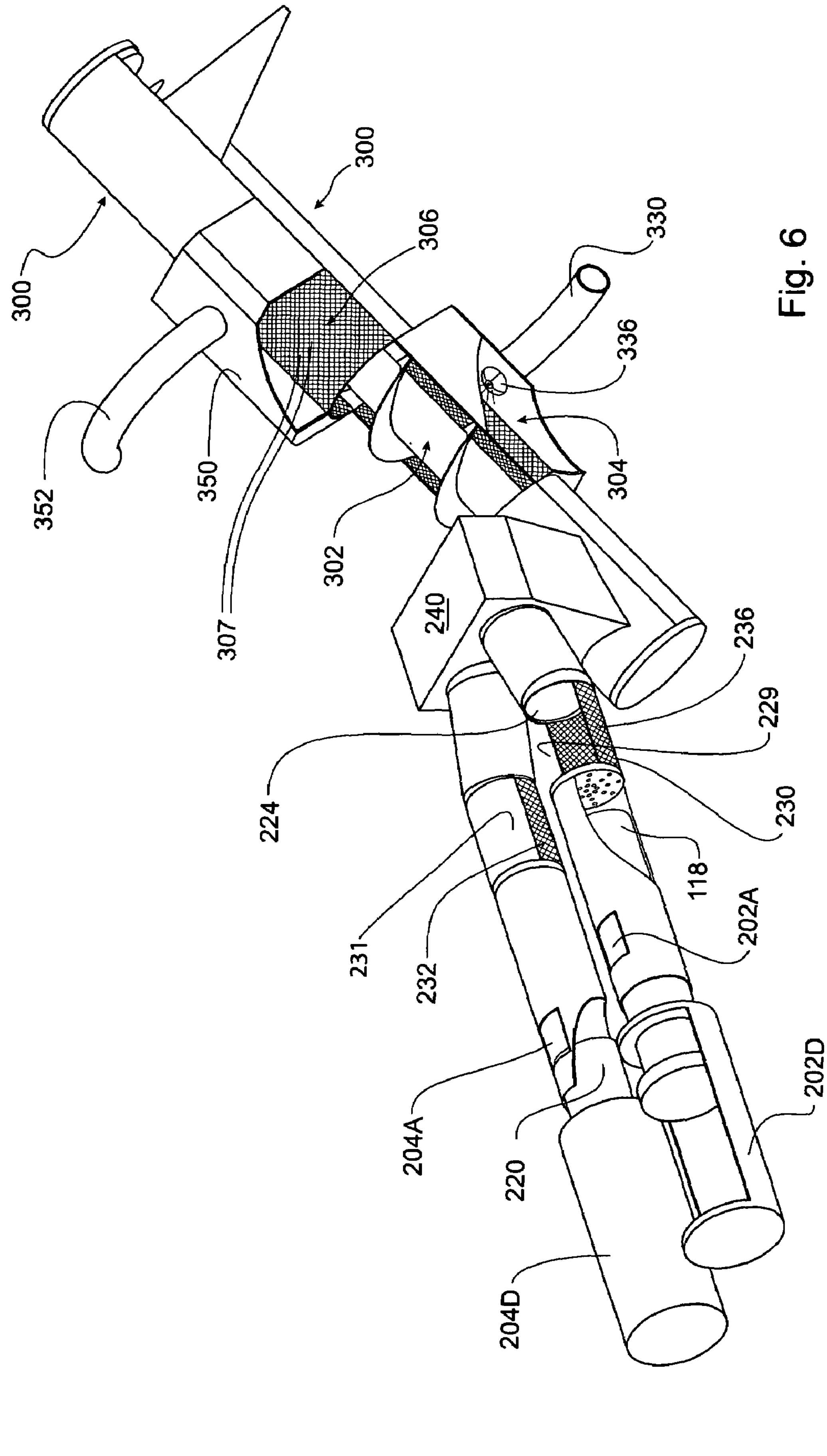

As best illustrated in FIGS. 5–7 of the drawings, in the preferred embodiment of the invention, the compression unit for essential oil extraction, 200, mainly consists of a pair of similar powerful hydraulic rams 210, 212, mounted into tubes 202, 204, and which by operating in alternating fashion, provides continuous load feed. Each ram 210, 212, has a piston 214, 216 and associated piston head 218, 220, slidably movable through corresponding compression chambers 222, 223, inside tubes 202, 204, between a retracted condition and an extended limit position. At its extended limit position, piston heads 218, 220, abut flatly against a corresponding compression plate 224, 226, anchored inside the respective tubes 202, 204; at its retracted position, piston head 218, 220, clear plates 224, 226. Plates 224, 226, are located adjacent the edge of tube apertures 202B, 204B opposite the tube downstream ends 202C, 204C of tubes 202, 204. Plates 224, 226, include a number of calibrated bores 228. A free tubular passageway 229, 231, is formed between corresponding plates 224, 226, and the tube downstream ends 202C, 204C.

The hydraulic rams 210, 212, produce repeated compression by reciprocal alternate push cycles, to compress the small tree parts N against the calibrated perforated plate 224, 226, so that solid tree parts N are transformed—beyond compression through perforated plates 224, 226—into a solution comprising a solid phase and a second liquid phase. This liquid phase, rich in essential oil, will seep through and drip from the arcuate screens 230, 232, to be retrieved below into funnel 234. An oil tank 235 (FIG. 7) is positioned beneath funnel 234. The solid phase needle parts N having passed through bores 228 of calibrated plates 224, 226, then progressively advance through passageways 229, 231, under stepwise repeated push from each additional upstream load of coarse muka exiting from perforated plates 224, 226. This solid phase needle part N eventually reach through and beyond funnel elbow channel 240.

Arcuate screens 230, 232, which have been applied against lower apertures 202B, 204B, thus allow therethrough liquid components, while the solid components N generated by the compression forces of rams 210, 212, remain inside the passageways 229, 231. A funnel collector 234 is positioned beneath filter plate 230, 232, for gravity collecting in liquid state the essential oils dripping from perforated plates 224, 226.

As indicated hereinabove, hydraulic rams 210, 212, preferably reciprocate in alternate fashion. Each hydraulic ram 210, 212 is connected via corresponding pairs of intake/outlet feed lines 500, 502 and 504, 506, respectively to hydraulic fluid source and pump assembly 404. Fluid flow is controlled along feed lines 500, 502 and 504, 506 by second and third control valves 508, 510, respectively.

Each perforated plates 224, 226, is for example a metallic plate of about 38 to 51 mm thick, having a plurality of bores 228. Each bore 45 has a diameter which may range for example between 3.5 and 10 mm.

Arcuate screens 230, 232, each preferably consists of a metallic plate, for example of about 6.5 to 13 mm in thickness, with a plurality of bores 236. Each bore 236 may have a maximum diameter ranging between 0.4 and 1 mm thus allowing only liquid phase from compressed needle parts, exclusively of solid phase, to flow therethrough.

A thermal essential oil extraction unit 300 is serially connected to compression unit 200 via closed funnel elbow channel 240. Thermal unit 300 includes an elongated upwardly inclined variable pitch endless screw 302, rotatable at a constant speed, a vapour injection system 304, an arcuate filter plate screen 306 located at an intermediate section of the length of endless screw 302, and an outlet 310 at the top end of endless screw 302 for escape of the residues (the "muka"). A tubular sleeve 312—with open windows at sections 304 and 306, spacedly envelopes endless screw 302.

The endless variable pitch screw 302, consists of three sections. The first section is with fixed pitch 302A, a second section is with double pitch 302B, and a third section is with fixed pitch 302C identical to the first section.

Arcuate filter plate screen 306 lines the interior of sleeve 312 along portions 350 thereof, and may consist of a metallic plate, for example of about 6.5 to 13 mm in thickness, with a plurality of bores 307. Each bore 307 has a diameter ranging for example between 0.5 to 0.8 mm. Screen 306 will allow free passage of outflow vapour—not excluding water vapour and essential oil gases but not the remaining solid needles or other residues that have entered the downstream end portion of endless screw 302.

As shown in FIG. 7, the vapour injection system 304 encloses a vapour injection chamber with vapour nozzles 336 to which is fed water vapour via a feed line 330. Feed line 330 is connected to a steam generator 332. A water line 334 feeds tap water to steam generator 332.

When the compressed solid tree parts N coming from elbowed channel 240, engage into the vapour injection chamber 304, they are conveyed toward the top outlet 310 by rotation of the endless screw 302. In the intermediate portion of elongated sleeve 312, the pitch of the endless screw 302B allows positive dispersal of the solid compressed tree parts N on a larger surface, in order to maximize the vapour effect which heats the needles N to extract from them the essential oils. The vapour of essential oils, under evaporation pressure gradient forces, will slide with the water vapour along the interior wall of the sleeve 312, and seep through the filter plate 306, to then be retrieved in a retrieval head 350.

As illustrated in FIG. 7, an outlet line 352 is connected to vapour retrieval head 350, for escape of water vapour and essential oil vapour therein. A condenser unit 354 is serially mounted to line 352. A vapour P-trap 356 diverts essential oil vapour condensate to a collecting tank 358, via line 360, while the water vapour condensate is segregated from essential oil and returned to steamer 332 by return line 362. The needle residues (the muka) will then appear at the top outlet 310 of the inclined chamber 312, to fall into muka reservoir 380 positioned in underlying register with raised outlet 310.

The essential oil present in the needles N is thus ultimately extracted in liquid form from the solid needles, in either one or both of two methods:

a) by compressive force at the end of ram means 210, 212, with a meat grinder-like type compressor unit; and/or b) by submitting the tree needles N to water steam vaporized from spray nozzles 336, along the endless screw 302, so as to extract under thermal heating the essential oils from the needles N and generate a gazeous mix of water vapour and needles gazes at outlet 350, which mix is thereafter collected downstream in a tubular network 352 where selective densimetric condensation at 354, 356, enables to separate liquid water from liquid essential oil.

It is noted that whenever we refer to needles N in this specification, we mean to say all small size three parts that have been shaken loose by the rotating chains of drums 12–15 from the large tree parts, and eventually those that have passed through the bores of vibrating sieve screen 20, and that contain at least some essential oil component. Accordingly, needles N could include small branches, bark, fragments and needles.

Since the present essential oil reclaim apparatus will be quite large, it is envisioned to be mounted inside an industrial plant, located remotely from the logging site.

The essential oils that are collected, can be sold in their crude state to oil refining plants, where the oils can be either treated by cracking or rectification, or otherwise admixed into a variety of compounds. The essential oils can be used in aromatherapy, in the manufacture of pharmaceutical compounds, in cosmetics, in perfumes, in soaps and in detergents. The vitamins and the proteins found in the extraction residues (the "muka") could be used in animal feed as flour, at a competitive cost. Adding these elements into animal feed would enable the production of a foodstuff that would achieve superior standards while reducing the need for systematic recourse to antibiotics in animal feed.

I claim:

1. An essential oil reclaim apparatus for continuous extraction of essential oil from coniferous tree needles, said apparatus comprising:

conveyor means, for moving in a continuous fashion a number of felled coniferous tree parts from a felled tree intake loading area, through a processing area, and toward a tree discharge outlet;

an impacting unit, mounted into said processing area for shaking the trees for releasing branches and needles thereof from the felled coniferous tree;

first screen means, mounted beneath said impacting unit for segregating separate branches from needles falling down from said impacting unit;

a compression unit, defining a main elongated tubular body having:

a) a needle intake, mounted beneath said first screen means for collecting the needles segregated by said first screen means;

b) a liquid outlet, mounted spacedly from said needle intake;

c) compression means acting inside said tubular body and extending between said needle intake and said essential oil outlet for continuously compressing the needles wherein a liquid phase of needles is mechanically extracted from the solid needle parts to flow as a liquid inside the tubular body and to escape said tubular body through said liquid outlet of the tubular body; wherein reclaim of liquid essential oil from the tree needles may be obtained from said liquid phase of needles.

2. An essential oil reclaim apparatus as in claim 1, further including a coarse muka outlet, mounted on said tubular body downstream of the first mentioned said essential oil outlet, for through passage of the solid needle parts, and further including a vapour unit for fine thermal extraction of essential oil from the solid needle parts, said vapour unit comprising:

a) an endless screw assembly having an intake end, in fluid communication with said coarse muka outlet for loading therein coarse muka generated by said compression means, and a fine muka outlet end, opposite said intake end thereof;

b) fluid spraying means, mounted to a first intermediate section of said endless screw assembly intermediate said intake end and said outlet end of the endless screw assembly, for spraying water vapour onto the coarse muka moving along said endless screw assembly;

c) condensate collecting means, mounted to a second intermediate section of said endless screw assembly being intermediate said spraying means and said fine muka outlet end, for collecting condensate water vapour and essential oil vapour generated from the sprayed coarse muka moving along said endless screw assembly;

d) fine muka collecting means, mounted downstream of said fine muka outlet end of endless screw assembly;

wherein fine thermal extraction of essential oil from coarse muka is obtained at said condensate collecting means.

3. An essential oil reclaim apparatus as in claim 2, wherein said impacting unit includes a main frame carrying a number of power driven rotating drums spaced from one another, each said drum comprising a number of flexible chains peripherally spaced from one another, said chains extending radially under centrifugal forces when said drums are rotating, the relative location of said drum and the length of said chains being such as to generate a felled tree passageway therebetween whereby said chains are able to reach out to most of the branches of the felled trees moving through said processing area.

4. An essential oil reclaim apparatus as in claim 3, wherein said first screen means consists of:

a) a perforated plate, independently mounted to said main frame of said impacting unit, and b) a vibratory motor means for reciprocating in vibrating mode said perforated plate;

wherein only small tree part elements beyond a set threshold shall be allowed to pass freely through said first screen means and toward and into said needles intake.

5. An essential oil reclaim apparatus as in claim 4, wherein said perforated plate is inclined, and further including branch collecting means mounted beneath the lowermost edge of said inclined perforated plate, whereby branches falling onto said perforated plate slide slopewisely thereal-ong toward and into said branch collecting means away from said perforated plate to clear the way for through passage of the needles through said perforated plate.

6. An essential oil reclaim apparatus as in claim 5, further including a second perforated plate mounted beneath the first mentioned perforated plate, each of the first mentioned perforated plate and of said second perforated plate having a plurality of bores adapted to register with one another in an operative condition thereof, and ram means for carrying and reciprocating said second perforated plate relative to the first mentioned perforated plate whereby a shearing action is formed between the first mentioned perforated plate and said second perforated plate.

7. An essential oil reclaim apparatus as in claim 6, wherein each of said perforated plates define throughbores having a maximum diameter ranging between about 6 to 30 mm.

8. An essential oil reclaim apparatus as in claim 7, wherein said maximum diameter of said perforated plates is about 15 mm.

9. An essential oil reclaim apparatus as in claim 2, wherein said compression means includes a pair of first and second hydraulic ram members, extension and retraction of said first and second hydraulic ram members occurring in alternating fashion for continuous feed of solid needle parts through said coarse muka outlet of the tubular body.

10. An oil reclaim apparatus as in claim 2 wherein said spraying means includes a steam generator, a feed line fluidingly interconnecting said steam generator and said first intermediate section of endless screw assembly, and at least one nozzle member mounted over said endless screw assembly and directed toward the latter at said first intermediate section thereof.

11. An oil reclaim apparatus as in claim 2, wherein said condensate collecting means includes a head plate, carried spacedly over said second intermediate section of endless screw assembly, a condenser unit, a feed line fluidingly interconnecting said condenser unit and said head plate for fluid flow from said head plate of water vapour and of essential oil vapour, a vapour P-trap segregating water vapour from essential oil vapour at said condenser unit, and a collecting tank, for collecting liquid essential oil segregated from water vapour by said vapour P-trap.

12. An essential oil reclaim apparatus as in claim 2, further including fine muka collecting means, mounted at the downstream end of said fine muka outlet end of endless screw assembly.

13. An essential oil reclaim apparatus as in claim 2, further including an arcuate screen, applied against said liquid outlet of compression unit, said arcuate screen having a plurality of bores each of a size sufficient for free passage of essential oil rich liquid phase exclusively of solid coarse muka.

14. An essential oil reclaim apparatus as in claim 2, wherein the porosity of each bore of said arcuate filter plate screen defines a maximal bore size ranging between 0.4 and 1 mm.

15. An essential oil reclaim apparatus as in claim 12, further including an arcuate filter plate screen, applied against said second intermediate section of endless screw assembly, said arcuate filter plate screen being porous to gaseous essential oil and to water vapour for through passage thereof toward said condensate collecting means, but being impervious to solid fine muka.

16. An essential oil reclaim apparatus as in claim 14, wherein the porosity of said arcuate filter plate screen defines a maximum bore size ranging between 0.5 and 1 mm.

17. An essential oil reclaim process for continuous extraction of essential oil from coniferous tree needles, said process comprising the following steps:

moving in a continuous fashion on a conveyor member a number of felled coniferous trees from a tree intake loading area, through a processing area, and toward a tree discharge outlet;

shaking the trees with an impacting unit mounted into said processing area for releasing branches and needles thereof from the felled coniferous tree;

screening the branches from the needles with first screen means, mounted beneath said impacting unit for segregating branches from needles of the trees;

compressing in continuous fashion the needles generated by said first screen means to mechanically extract essential oil therefrom as liquid outflow, whereby a solid phase coarse muka is obtained;

wherein reclaim of liquid essential oil is obtained from needles.

18. An essential oil reclaim process as in claim 17, further comprising the following additional steps:

moving through an endless screw said coarse muka from a loading end toward a fine muka outlet end;

spraying water vapour onto the coarse muka at an intermediate spraying section of said endless screw;

collecting the condensate from water vapour and essential oil vapour generated from the coarse muka at a section of said endless screw intermediate said spraying section thereof and said fine muka outlet end thereof;

segregating water vapour from essential oil vapour from said condensate; and collecting the thus segregated said essential oil vapour;

wherein fine thermal extraction of essential oil is further achieved.

19. An essential oil reclaim process as in claim 18, further including the step of collecting the fine muka at said fine muka outlet end of endless screw assembly, once said fine muka exits therefrom.

* * * * *